US008654943B2

(12) United States Patent
Pearson et al.

(10) Patent No.: US 8,654,943 B2
(45) Date of Patent: Feb. 18, 2014

(54) SYSTEM AND METHOD OF ENHANCED CALLER-ID DISPLAY USING A PERSONAL ADDRESS BOOK

(75) Inventors: Larry B. Pearson, San Antonio, TX (US); Matthew Strand Bruening, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2180 days.

(21) Appl. No.: 11/404,556

(22) Filed: Apr. 14, 2006

(65) Prior Publication Data

US 2007/0263853 A1    Nov. 15, 2007

(51) Int. Cl.
*H04M 11/00* (2006.01)

(52) U.S. Cl.
CPC ..................................... *H04M 11/00* (2013.01)
USPC .................. 379/93.23; 379/90.01; 379/142.01

(58) Field of Classification Search
USPC .......... 379/93.23, 90.01, 93.05, 93.06, 93.08, 379/93.25, 142.01–142.07, 142.17, 413.03; 455/454, 414.1, 426.1
See application file for complete search history.

(56) References Cited

U.S. PATENT DOCUMENTS

| | | | |
|---|---|---|---|
| 5,574,779 A | 11/1996 | Ely et al. | |
| 5,583,927 A | 12/1996 | Ely et al. | |
| 5,696,815 A | 12/1997 | Smyk | |
| 5,805,677 A | 9/1998 | Ferry et al. | |
| 5,825,862 A | 10/1998 | Voit et al. | |
| 6,052,444 A | 4/2000 | Ferry et al. | |
| 6,427,003 B1 | 7/2002 | Corbett et al. | |
| 6,584,490 B1 | 6/2003 | Schuster et al. | |
| 6,677,964 B1 | 1/2004 | Nason et al. | |
| 6,717,596 B1 | 4/2004 | Nason et al. | |
| 6,727,918 B1 | 4/2004 | Nason | |
| 6,731,727 B2 | 5/2004 | Corbett et al. | |
| 7,133,507 B2 | 11/2006 | Basore et al. | |
| 7,206,401 B2 | 4/2007 | Freeny, Jr. et al. | |
| 7,693,270 B2 | 4/2010 | Beck et al. | |
| 2003/0147518 A1 | 8/2003 | Albal et al. | |
| 2004/0203835 A1* | 10/2004 | Trottier et al. | 455/454 |
| 2006/0123053 A1 | 6/2006 | Scannell, Jr. | |
| 2007/0036313 A1* | 2/2007 | White et al. | 379/142.17 |
| 2007/0115389 A1 | 5/2007 | McCarthy et al. | |
| 2007/0143831 A1 | 6/2007 | Pearson et al. | |
| 2007/0169144 A1 | 7/2007 | Chen et al. | |
| 2007/0190981 A1* | 8/2007 | Winkler | 455/414.1 |

OTHER PUBLICATIONS

"Caller ID"—from Wikipedia, The Free Encyclopedia, Dec. 2005, 2 pp.—"http://en.wikipedia.org/wiki/Caller_ID".
"Analog_Telephony_Adapter"—from Wikipedia, The Free Encyclopedia, Dec. 2005, 1 pp.—"http://en.wikipedia.org/wiki/Analog_Telephony_Adapter".

(Continued)

*Primary Examiner* — Melur Ramakrishnaiah
(74) *Attorney, Agent, or Firm* — Toler Law Group, PC

(57) ABSTRACT

In one particular embodiment, a method includes receiving at a set-top box a call signal including a caller identifier from a network, where the caller identifier includes a calling number and a billing name associated with the calling number. An alias (or display name) associated with the calling number is retrieved from a personal address book stored in a memory of the set-top box. A modified caller identifier including the calling number and the alias is provided to a display device.

10 Claims, 9 Drawing Sheets

(56) References Cited

OTHER PUBLICATIONS

"Foreign Exchange Station"—from Wikipedia, The Free Encyclopedia, Dec. 2004, 1 pp.—"http://en.wikipedia.org/wiki/Foreign_exchange_station".

"Parlay"—from Wikipedia, The Free Encyclopedia, Mar. 2005, 3 pp.—"http://en.wikipedia.org/wiki/Parlay".

"Cisco SIP IP Phone Administrator Guide Version 3.0, Appendix B", Jan. 2002, pp. B-1 to B-4.

Dorf, Richard C., "The Electrical Engineering Handbook", 1997, CRC Press LLC, Second Edition, pp. 1626-1628.

* cited by examiner

US 8,654,943 B2

SYSTEM AND METHOD OF ENHANCED CALLER-ID DISPLAY USING A PERSONAL ADDRESS BOOK

FIELD OF THE DISCLOSURE

The present disclosure is generally related to systems and methods of providing enhanced caller ID functionality.

BACKGROUND

Conventionally, telephone networks are capable of providing calling name and number services to subscribers. Typically, Voice over IP (VoIP) networks, like the Time Division Multiplex (TDM) based Public Switched Telephone Network (PSTN), pull the billing (or subscriber) name information from Line Information Databases (LIDBs).

Some VoIP service providers allow customers to use their existing analog telephone sets by connecting their phone sets to an Analog Telephony Adapter (ATA). The ATA provides the analog signals needed to transmit calling number and billing name information to the attached analog telephone sets.

While billing name information retrieved from the LIDBs is generally accurate, the name identifier may not accurately identify the caller. For example, a caller may be known by a nickname, while the billing information may refer to the caller's legal name. As another example, a call placed from a business phone may identify the business, but not the caller.

As a result, customer premises equipment (CPE) or carrier equipment has been adapted to substitute the name of the caller from a personal address book (PAB) record containing a matching telephone number. Unfortunately, for this type of caller ID system to work, the personal address book is stored either in the called telephone or in the carrier.

There is an on-going need for an enhanced caller ID system that correctly identifies the caller.

DETAILED DESCRIPTION OF THE DRAWINGS

Figure 1:
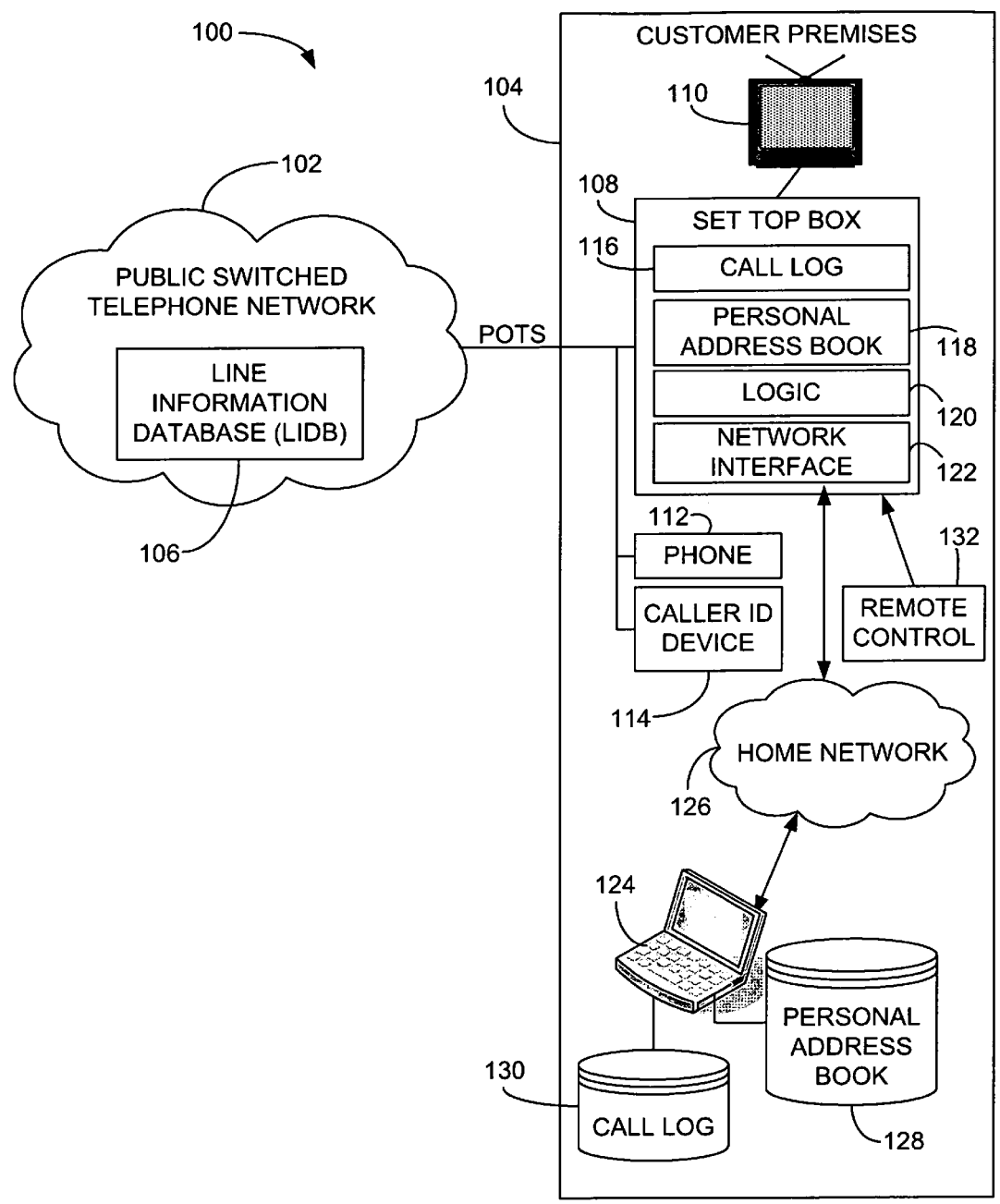
FIG. 1 is a block diagram of an illustrative embodiment of a system to provide enhanced caller identification via a set-top box using a personal address book.

In one particular embodiment, a method includes receiving at a set-top box a call signal including a caller identifier from a network, where the caller identifier includes a calling number and a billing name associated with the calling number. An alias (or display name) associated with the calling number is retrieved from a personal address book stored in a memory of the set-top box. A modified caller identifier including the calling number and the alias is provided to a display device.

In another particular embodiment, a set-top box includes a memory to store a personal address book and logic that is coupled to a display device, to the memory, and to a public switched telephone network. The logic receives a call signal including a calling number and a billing name from the public switched telephone network and retrieves an alias from the personal address book corresponding to the calling number. The logic provides the calling number and the alias to the display device when the calling number matches a calling number of the personal address book.

In yet another particular embodiment, a processor readable medium embodies processor readable instructions to provide enhanced caller identification functions. The processor readable instructions include instructions to search a personal address book for a stored number corresponding to a calling number in response to receiving a caller identifier including the calling number and an associated billing name, instructions to retrieve an alias associated with the calling number from the personal address book, and instructions to generate the output signal including the calling number and the alias. In a particular embodiment, the processor readable instructions include instructions to define a schedule to synchronize the personal address book to the second personal address book. In still another particular embodiment, the processor readable instructions include instructions to define a search order to search the personal address book and the second personal address book.

In another particular embodiment, a method includes receiving at an analog telephony adapter (ATA) unit a Voice over Internet Protocol (VoIP) call signal including a caller identifier, where the caller identifier including a calling number. An alias (display name) associated with the calling number is retrieved from a personal address book. A modified caller identifier including the calling number and the alias are provided to a caller ID device. In a particular embodiment, the modified caller identifier is provided to a set-top box adapted to provide the modified caller identifier to a display device. In another particular embodiment, the method includes storing calling numbers and associated alias information in the second personal address book and synchronizing the personal address book to the second personal address book in a memory coupled to the set-top box.

In still another particular embodiment, a multi-function unit includes a memory to store a personal address book and logic coupled to the memory and to a public switched telephone network. The logic receives a Voice over Internet Protocol (VoIP) call signal including a calling number and from the public switched telephone network, retrieves an alias from the personal address book corresponding to the calling number, and provides the calling number and the alias to a caller ID device when the calling number matches a calling number of the personal address book.

FIG. 1 is a block diagram of an illustrative embodiment of a system 100 to provide enhanced caller identification via a set-top box using a personal address book. The system 100 includes a set-top box 108 at a customer premises 104, which is coupled to a public switched telephone network (PSTN)

102 via a plain old telephone service (POTS) connection. The PSTN includes a line information database (LIDB) 106. The customer premises may include a display 110, the set-top box 108, a phone 112, and a caller identification (ID) device 114.

The set-top box 108 is connected to a display, such as television 110. Additionally, the set-top box 108 includes a call log 116, a personal address book (PAB) 118, logic 120, and a network interface 122. The network interface 122 couples the set-top box to other devices, such as a portable computer 124, via a home network 126. The portable computer 124 may include a personal address book (PAB) 128 and a call log 130.

In general, the PABs 118 and 128 include one or more records, where each record includes a phone number and an associated alias or name. The PABs 118 and 128 may also include other information associated with the alias. For example, the PAB 128 may include address information, birthdate information, and the like.

In operation, a customer may utilize the portable computer 124 to create a PAB 128. Alternatively, the customer may utilize the portable computer 124 to add names to the PAB 118 via the home network 126. In another embodiment, the logic 120 may be configured to provide a user interface accessible to a remote control 132 associated with the set-top box 104 or accessible to the portable computer 124 to configure the PAB 118. In yet another embodiment, the logic 120 may be configured to access multiple PABs, such as the PAB 118 and the PAB 128, in a user-specified order. In another embodiment, the logic 120 may be adapted to synchronize the PAB 118 to the PAB 128.

When a caller dials a phone number associated with a phone service provided to a customer of the customer premises 104, the call is received by the PSTN 102, which uses the calling number of the caller to search the LIDB 106 to identify a billing name associated with the calling number, assuming that the customer has subscribed to receive caller ID services from the PSTN 102. The PSTN 102 includes logic to provide the calling number or the calling number and a billing name to the set-top box 108 via the POTS connection. It should be understood that customers may subscribe for caller ID services from the PSTN 102 or they may choose not to subscribe. Additionally, there may be tiers within the caller ID services such as calling number only, billing name and calling number, and so on.

The set-top box 108 receives a call request from the PSTN 102 together with the calling number and optionally the billing name. The logic 120 of the set-top box 108 searches the PAB 118 for a phone number that matches the calling number. If a match is found, a name associated with the phone number within the PAB 118 is retrieved. The logic 120 either replaces the billing name of the calling number with the name from the PAB 118 or supplements the calling number with the name.

In one particular example, Roberta Smith may be the caller and she may be the mother of the called party. The set-top box 108 receives the call request from the PSTN 102. The call request includes the caller ID information from the LIDB 106, including a calling number and the billing name "Roberta Smith." The logic 120 of the set-top box 108 searches the PAB 118 for a matching phone number. If no match is found, the set-top box 108 provides the caller ID information to the display device 110 for display. If a match is found, the logic 120 replaces the calling name "Roberta Smith" with an alias, "Mom," from the PAB 118 to produce a modified caller ID. The modified caller ID information is provided to the display device 110 by the set-top box 108. Additionally, the modified caller ID information may be written to the call log 116 together with the date and time of the call.

In another particular example, the set-top box 108 receives the call request from the PSTN 102, including the calling number and the billing name "Roberta Smith." The logic 120 of the set-top box 108 searches the PAB 118 and finds no match. The logic 120 accesses PAB 128, which is a shared resource of the portable computer 124, and searches the PAB 128 for a match. If a match is found, the logic 120 replaces the calling name of the caller ID information with an alias from the PAB 128 to produce the modified caller ID information. The logic 120 provides the modified caller ID information to the display 110. In general, the particular order in which the logic 120 searches the PABs 118 and 128 may be specified by a user via the remote 132 or via the portable computer 124. In a particular embodiment, the logic 120 may be adapted to synchronize the PAB 118 to the PAB 128 via the home network 126. The logic 120 may be adapted to perform the synchronization at regular time intervals, at a pre-determined time, and so on.

By modifying the caller ID information to include information from a PAB, an incoming call can be identified correctly, even if the billing name of the caller is blocked, the PABs 118 and 128 may be used to provide a name or alias associated with the calling number. Moreover, the modified caller ID information may be recorded in the call log 116 and/or call log 130 to correctly identify the caller. Moreover, the logic 120 may be adapted to generate a missed call notification, such as an email message, including the modified caller ID information, such as the calling number and the display name from one of the PABs, when the call is not answered by the subscriber. In another particular embodiment, the set-top box 108 may be provided with logic 120 and a memory to record a message from a caller, and to transmit the message as an attachment to the missed call notification. In this manner, the missed call notification can correctly identify the caller, such as in a subject line of an email type notification, an instant message type notification, a pager-type notification, or any combination thereof.

Figure 2:
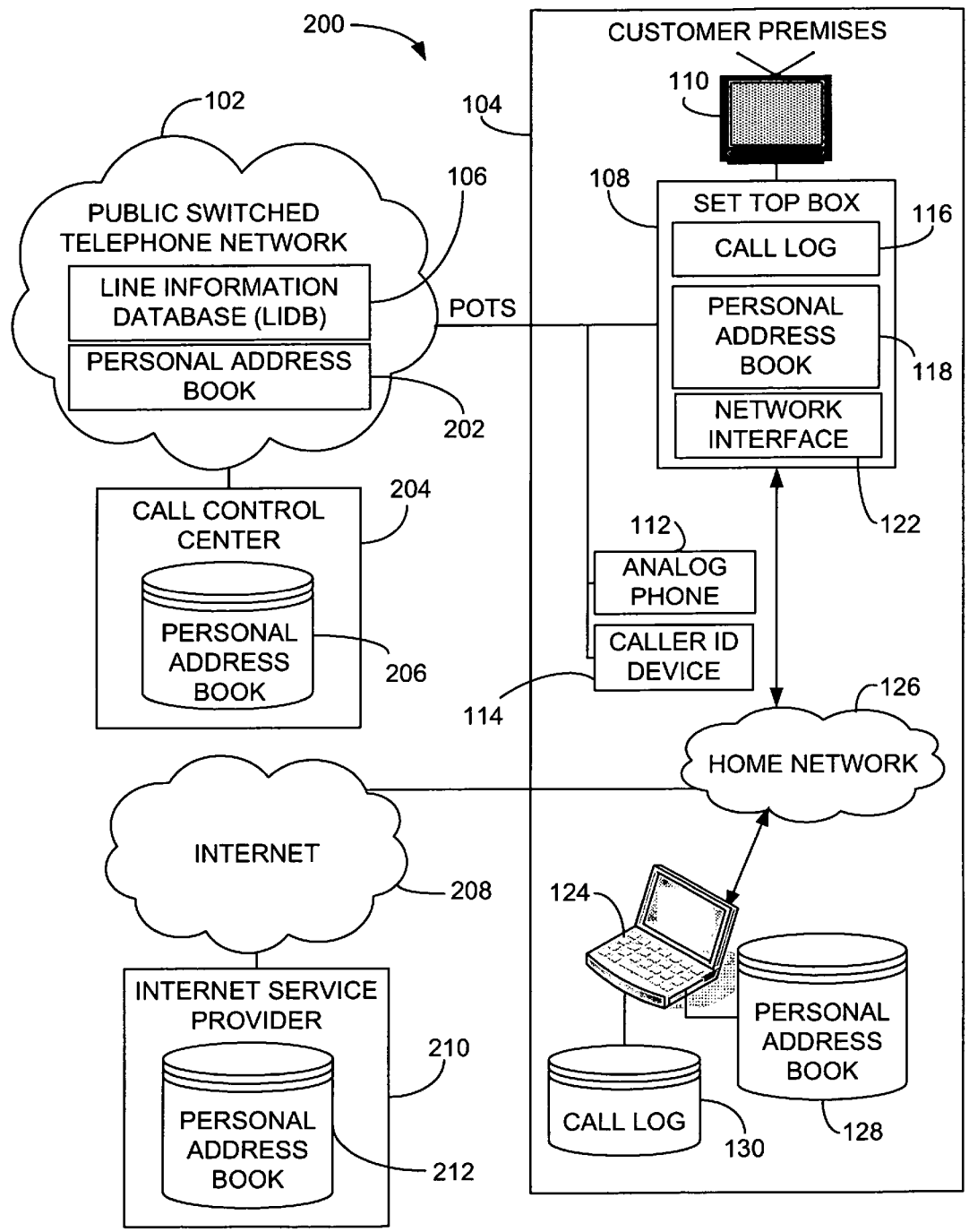
FIG. 2 is a block diagram of an alternate embodiment of a system to provide enhanced caller identification via a set-top box using a personal address book.

FIG. 2 is a block diagram of an alternate embodiment of a system 200 to provide enhanced caller identification via a set-top box using a personal address book. The system 200 includes a set-top box 108 of a customer premises 104, including a call log 116, a PAB 118, and a network interface 122. The system 200 also includes a display device 110, one or more analog phones 112, a caller ID device 114, a portable computer 124, a PAB 128, and a call log 130. The set-top box 108 is connected to a public switched telephone network (PSTN) 102, which includes a line information database (LIDB) 106 and a PAB 202. The PSTN 102 is connected to a call control center 204, which also includes a PAB 206. The customer premises 104 also includes a home network 126, which is connected to a wide area network (such as the Internet 208) via an Internet service provider (ISP) 210. The ISP 210 also includes a PAB 212.

In operation, a caller dials a telephone number associated with the customer premises. The PSTN 102 receives the call request. The PSTN 102 includes logic adapted to search the LIDB 106 for a billing name associated with the calling number. Depending on the particular customer, the PSTN 102 may search the PAB 202 and/or the PAB 206 to find a match. If a match is found, the PSTN 102 can forward caller ID information, including the calling number and the alias or name from one of the PABs 202 or 206, to the set-top box 108. The set-top box 108 is coupled to the display device 110 to display the caller ID information.

Alternatively, the set-top box 108 includes logic to search the local PAB 118 and/or PAB 128 of the portable computer 124. In yet another embodiment, the set-top box 108 may include logic to search PAB 212 stored by the ISP 210. The set-top box 108 may be configured to search multiple PABs in a particular user-specified order. Alternatively, a single PAB may be stored in any number of locations, including within the set-top box 108, within a memory of a portable computer 124 coupled to the set-top box 108, within a call control center 204, within a PSTN 102, or within an ISP 210.

In a particular embodiment, the set-top box 108 may include logic (such as logic 120 in FIG. 1) to synchronize the PAB 118 to the PAB 128, to the PAB 202, to the PAB 206, to the PAB 212, or to any combination thereof. In another particular embodiment, the set-top box 108 may include logic to generate and to transmit a missed call notification to a subscriber, such as by email, page, instant message, short message service (SMS) message, or any combination thereof.

Figure 3:
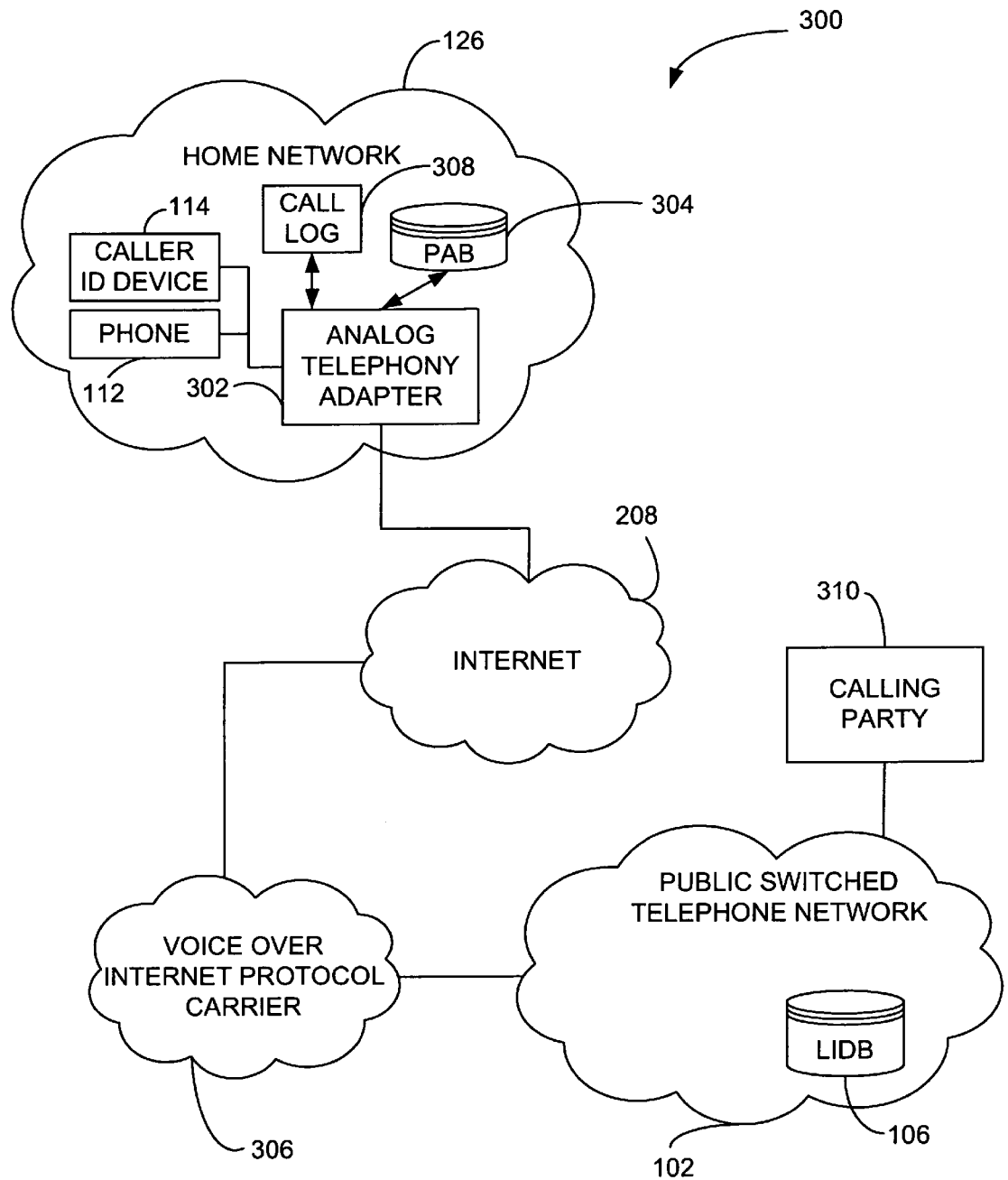
FIG. 3 is a block diagram of an illustrative embodiment of a system to provide enhanced caller identification in a Voice over Internet Protocol (VoIP) analog telephony adapter.

FIG. 3 is a block diagram of an illustrative embodiment of a system 300 to provide enhanced caller identification in a Voice over Internet Protocol (VoIP) analog telephony adapter. The system 300 includes an analog telephony adapter (ATA) 302, a PAB 304, a phone 112, and a caller ID device 114. The ATA 302 is connected to the Internet 208, and coupled to a VoIP carrier 306 and to a PSTN 102. The ATA may also include a call log 308 to store caller ID information for each received call. In general, an ATA 302 is a device to connect one or more analog telephones to a VoIP carrier 306. The ATA 302 may be a small device with a power adapter, an Ethernet port, and one or more foreign exchange station (FXS) telephone ports, which may be coupled to one or more telephones 112 or caller ID devices 114, transparently to the VoIP network. The FXS is a telephone interface that provides power, provides a dial-tone, and generates a ringing voltage for use by standard analog telephones.

In operation, a calling party 310 dials a telephone number associated with the ATA 302. The call is received at the PSTN 102. The calling number and the billing name can either be put together in the PSTN 102 via the LIDB 106 and passed to the VoIP carrier 306 or the VoIP carrier can pull the information from the LIDB 106, directly. The VoIP carrier 306 passes the call information to the subscriber's ATA 302 via the Internet 208. The ATA 302 matches inbound calling telephone numbers to a PAB 304, which may be internal or external to the ATA 302. If a match is found the PAB 304, the billing name associated with the calling number is replaced by a display name from the matching PAB entry. If no match is found, the subscriber's ATA provides the information from the LIDB 106 to the subscriber's phone 112, to the subscriber's caller ID device, or any combination thereof. In either case, the caller ID information is written to the call log 308, either with the calling number and billing name from the LIDB or with the calling number and the display name from the PAB 304.

Depending on the implementation, it should be appreciated that the PAB 304 may be stored in a memory of a portable computer (such as computer 124 in FIGS. 1 and 2) that may be coupled to the ATA 302. Alternatively, the PAB 304 may be stored in an Internet service provider of the Internet 208. In another embodiment, the PAB 304 may be stored by the VoIP carrier 306 or by the PSTN 102. The ATA 302 may be configured to access one or more PABs by a customer or by a provider service technician during installation.

The ATAs 302 may include a built-in web server, which can be utilized to host a user interface to configure settings for the ATA 302, such as a search order for one or more PABs, logical addresses for the one or more PABs, and the like. Additionally, the web server may be utilized to host call log capabilities, including defining a logical address to store call log information in a call log 308. The ATA 302 may also provide a user interface to display the call log information.

The ATA 302 may include logic to record a voice-mail message from a caller and to transmit a missed call notification to a subscriber. The missed call notification may include the voice-mail message as an attachment and may include a subject line that includes the modified caller information in a subject line, for example.

Figure 4:
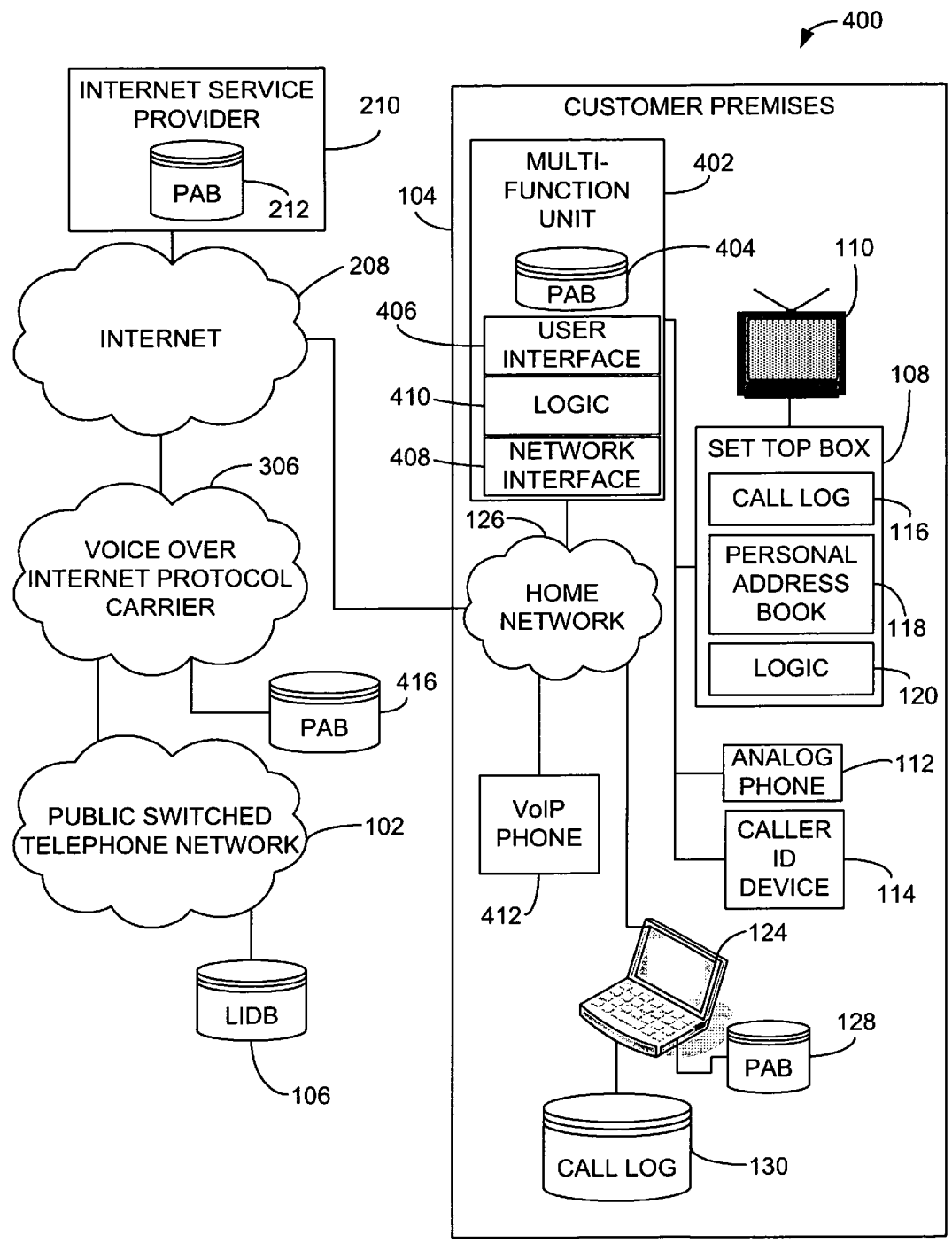
FIG. 4 is a block diagram of an illustrative embodiment of a system to provide enhanced caller identification via a multi-function unit using a personal address book.

FIG. 4 is a block diagram of an illustrative embodiment of a system 400 to provide enhanced caller identification via a multi-function unit using a personal address book. The system 400 includes a multi-function unit 402 including a PAB 404, a user interface 406, a network interface 408, and logic 410. The customer premises 104 may include the multi-function unit 402, a set-top box 108, a television 110, a VoIP phone 412, an analog phone 112, a caller ID device 114, and a portable computer 124. A home network 126 may connect the multi-function unit 402, the VoIP phone 412, and the portable computer 124 to the Internet 208. As shown, the PSTN 102 includes an LIDB 106, the VoIP carrier 306 includes a PAB 416, and the ISP 210 includes a PAB 212.

In operation, a call with caller ID information is provided to the home network 126 via the Internet 208 from, for example, the VoIP carrier 306. The logic 410 within the multi-function unit 402 may be adapted to search one or PABs, such as PAB 404, PAB 118, PAB 128, PAB 212, and PAB 416, in a user-specified order to identify a matching number. If a match is found, the caller ID information is modified to include a display name or alias from the PAB, and the calling number and display name are stored in the call log 118 or 130, in a call log (not shown) of the multi-function unit 402, or in any combination thereof. If no match is found, the calling number and billing name from the LIDB 106 may be provided to the television 110 via set-top box 108, to the caller ID device 114, to the analog phone 112, to the VoIP phone 412, or to any combination thereof. The calling number and the billing name are stored in the call log 118 or 130, in a call log (not shown) of the multi-function unit 402, or any combination thereof.

In one particular embodiment, the multi-function unit 402 includes the PAB 404. In another embodiment, the multi-function unit 402 is adapted to utilize the PAB 128 and the call log 130 of the portable computer 124 via the home network 126. In another particular embodiment, the multi-function unit 402 includes logic 410 to synchronize the PAB 404 to the PAB 128 of the portable computer 124 via the home network 126. In a particular embodiment, the logic 410 synchronizes the PAB 404 to the PAB 128 during periods of call inactivity. In another particular embodiment, the logic 410 synchronizes the PAB 404 to the PAB 128 periodically, either at a user-specified time, at a default time, or after pre-determined time intervals (such as every 8 hours).

In yet another particular embodiment, the multi-function unit 402 includes logic 410 to generate a missed call notification to a subscriber when the subscriber does not answer an in-coming call. The missed call notification may include a date and time of the missed call, a calling number, and either a display name from one of the PABs (416, 212, 404, 118, or 128) or a calling name from an LIDB 106. In one embodiment, the logic 410 may be adapted to record a voice-mail message from a caller and to attach the recorded voice-mail as an attachment to the missed call notification.

Figure 5:
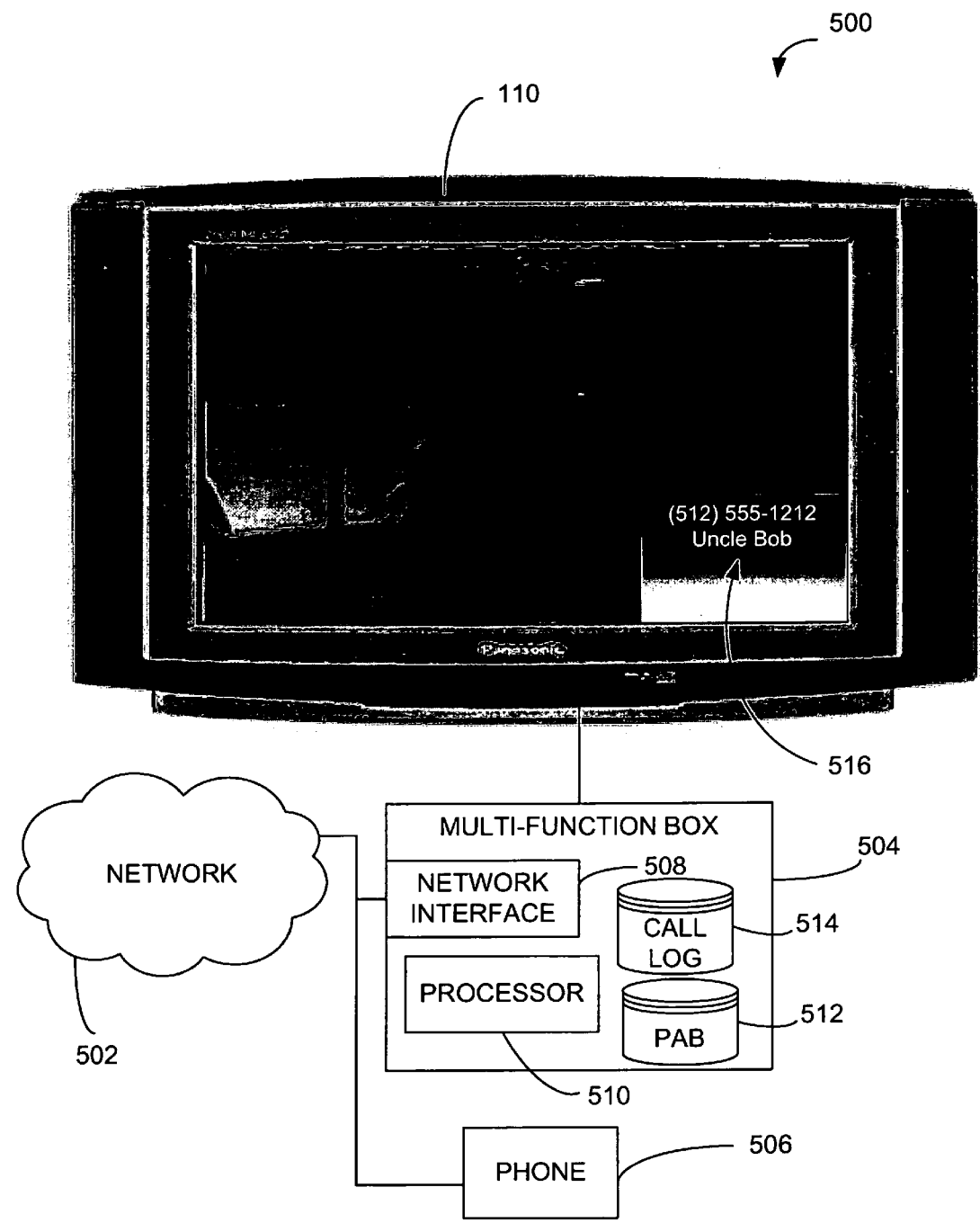
FIG. 5 is a block diagram of a system including a multi-function unit to provide enhanced caller identification functions.

FIG. 5 is a block diagram of a system 500 including a multi-function unit 504 to provide enhanced caller identification functions. The system 500 includes a display 110, a network 502, a multi-function unit or box 504, and a phone 506. The multi-function unit 504 includes a network interface 508, a processor 510, a PAB 512, and a call log 514. The multi-function unit 504 is connected to the network 502, such as a PSTN, the Internet, and the like, via the network interface 508 to receive telephone calls and caller ID information.

The processor 510 of the multi-function unit 504 is adapted to execute processor readable instructions to search the PAB 512 for a matching entry to an incoming call, to execute instructions to replace the caller ID information with a display name from the PAB 512 if a match is found, and instructions to provide the modified caller ID information to the display 110. Additionally, the caller ID information may be recorded in the call log 514.

In operation, the multi-function box 504 receives a call, including a calling number and optionally a billing name, from the network 502 via network interface 508. The processor 510 searches the PAB 512 for a phone number that matches the calling number. If a match is found, the processor 510 replaces a billing name or supplements the calling number with a display name from the PAB 512, stores the calling number and display name in the call log 514, and provides the calling number and the display name to the display device 110. As shown, the display device 110 may display the calling number and display name in a pop up or slide up display box 516. In the particular embodiment shown, the display name is "Uncle Bob," which corresponds to the phone number "(512) 555-1212."

In one particular embodiment, the phone may be adapted with a caller ID function, and the multi-function box 504 may replace the caller ID information for display by the phone 506 as well as the display device 110.

In a particular embodiment, the processor 510 may be adapted to execute instructions to provide a missed call notification, such as an email message, instant message, text message, pager message, or any combination thereof, to a subscriber, when a call is not answered. The missed call notification may include the calling number and the display name associated with the calling number in the PAB 512. The processor 510 may also execute instructions to record a voice message of the caller and to attach the voice message as an attachment to the missed call notification.

Figure 6:
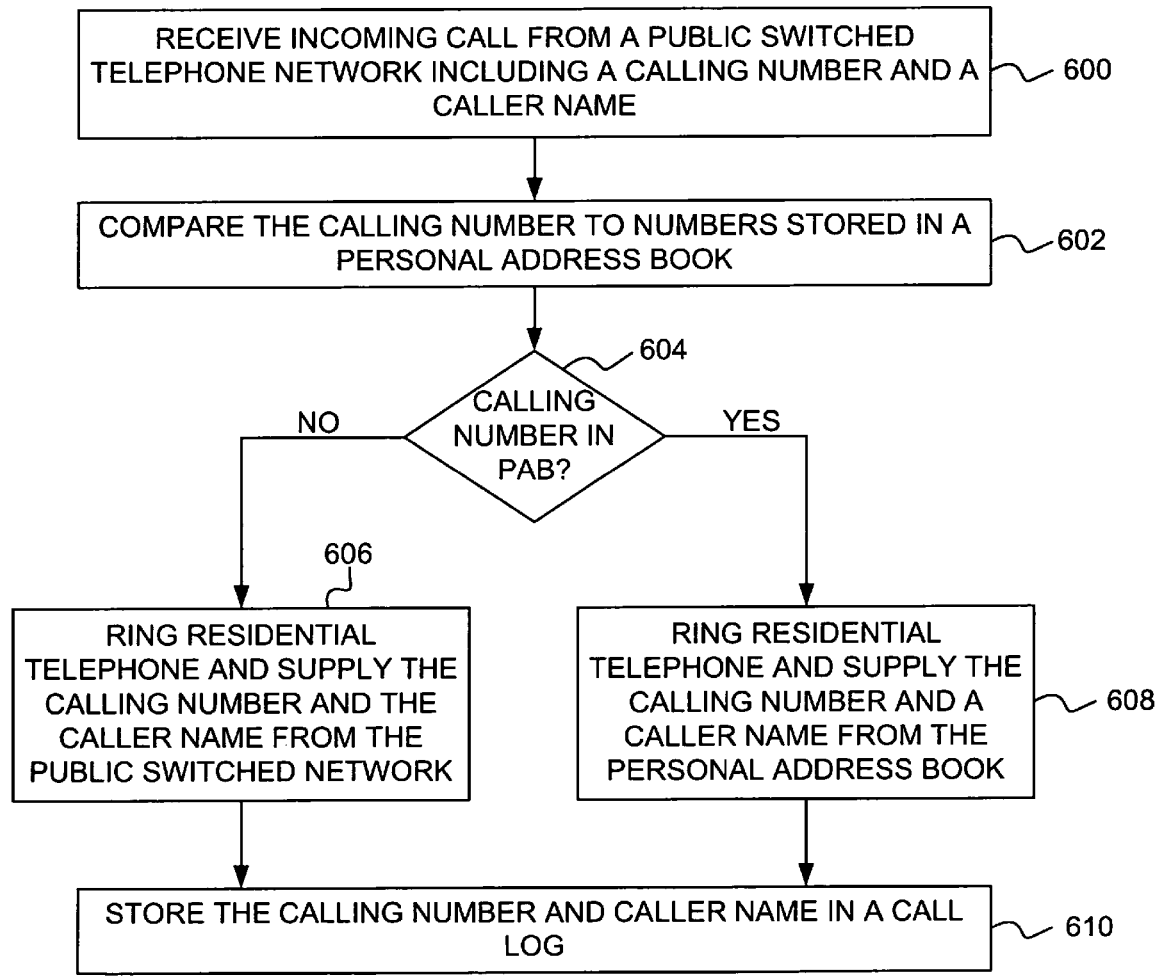
FIG. 6 is a block diagram of a method of providing enhanced caller identification using a personal address book.

FIG. 6 is a block diagram of a method of providing enhanced caller identification using a personal address book. An incoming call is received from a PSTN including a calling number and optionally a caller name (block 600). The calling number is compared to numbers stored in a personal address book (block 602). If the calling number is not in the PAB (block 604), the residential telephone is rung and the caller name from the PSTN is supplied to a display device (block 606), which may be a television, a caller ID device, a telephone with caller ID functions, or any combination thereof. The calling number and the caller name are stored in a call log (block 610). Alternatively, if the calling number is in the PAB (block 604), the residential telephone is rung and the calling number and a caller name from the PAB are supplied to a display device (block 608), which may be a television, a caller ID device, a telephone with caller ID functions, or any combination thereof. The calling number and the caller name from the PAB are stored in a call log.

Figure 7:
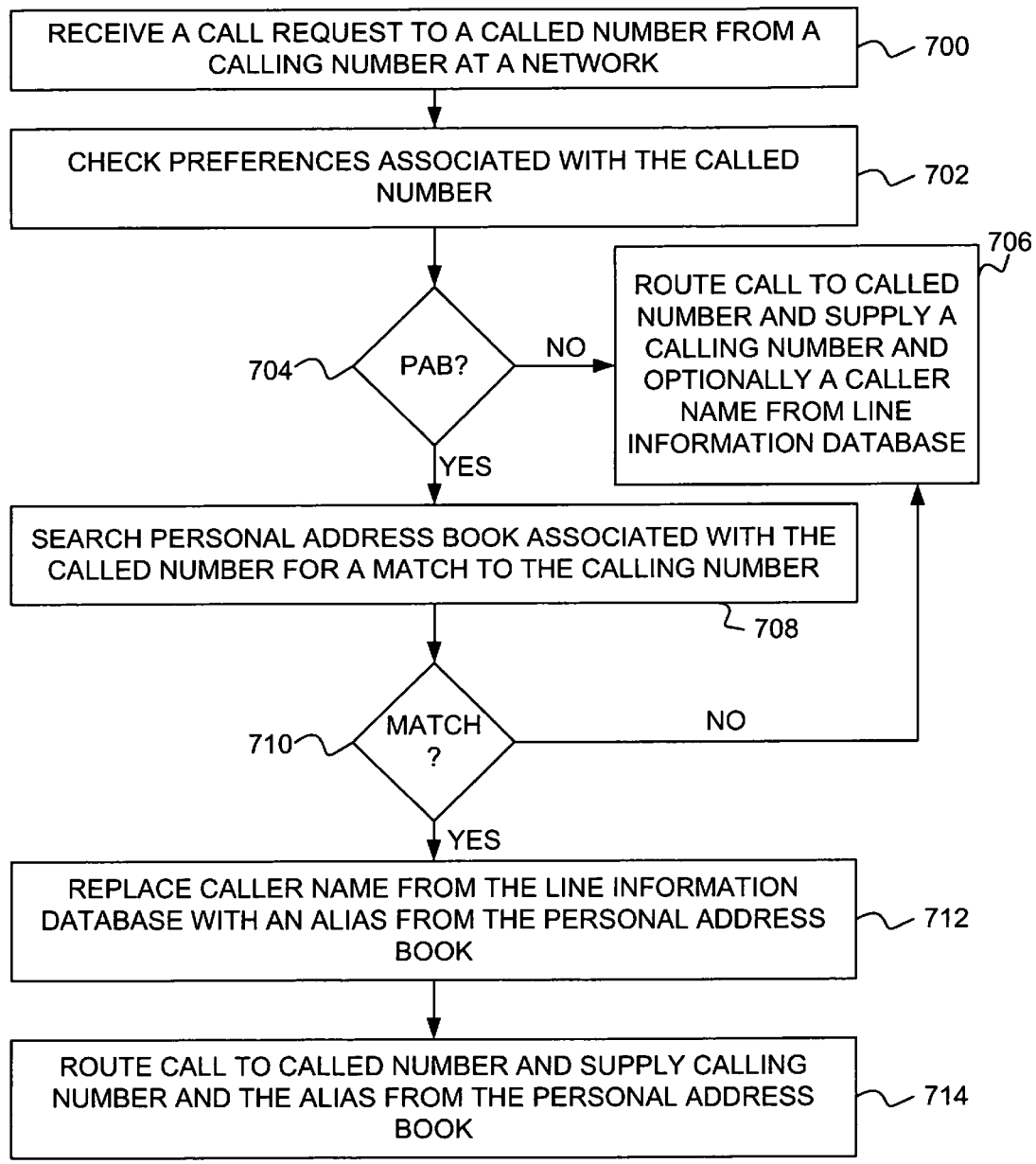
FIG. 7 is a block diagram of a method of providing enhanced caller identification using a personal address book at a server.

FIG. 7 is a block diagram of a method of providing enhanced caller identification using a personal address book at a server. A call request from a calling number to a called number is received at a network (block 700). The server checks preferences associated with the call number (block 702). The preferences may include a location of a PAB, types of services for the called number, an order of PABs to be searched, or any combination thereof. If there is no personal address book (block 704), the call is routed to the called number and the server supplies the calling number and optionally a caller name from the LIDB (block 706). If there is a personal address book (block 704), the server searches the personal address book associated with the called number for a match to the calling number (block 708). It should be understood that the server may be a server of a PSTN, a server of a VoIP service provider, a server of a customer premises (with a shared directory accessible to a service provider), or any combination thereof. Moreover, it should be understood that the server may provide calling services for multiple customers, and that the server may host a plurality of PABs, where each PAB is associated with at least one called number.

If there is no match between the calling number and a number in the PAB (block 710), the call is routed to the called number and the server supplies the calling number and optionally a caller name from the LIDB (block 706). If there is a match (block 710), the caller name from the LIDB is replaced with an alias or name from the PAB (block 712). The call is routed to the called number, and the calling number and the alias from the PAB are supplied with the call (block 714).

Figure 8:
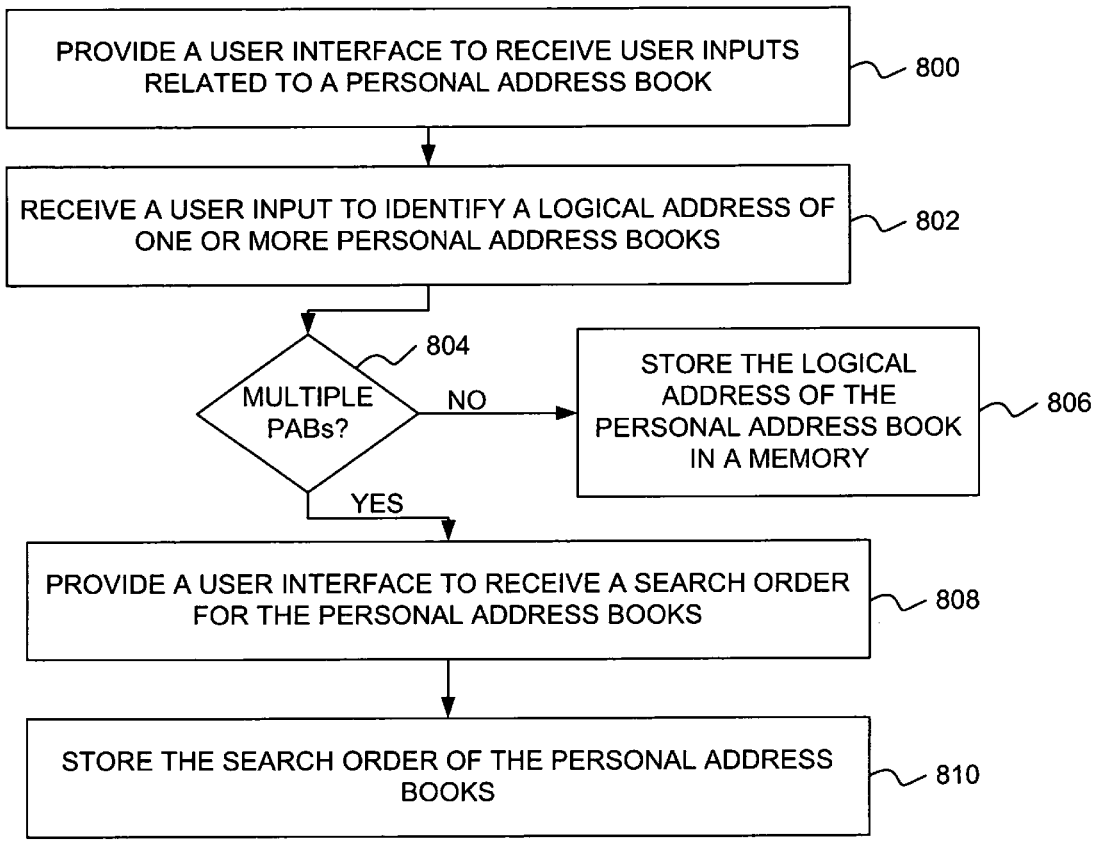
FIG. 8 is a block diagram of a method of configuring a multi-function unit to perform the enhanced caller identification using one or more personal address books according to user preferences.

FIG. 8 is a block diagram of a method of configuring a multi-function unit to perform the enhanced caller identification using one or more personal address books according to user preferences. A user interface is provided to receive user inputs related to a PAB (block 800). A user input is received via the user interface to identify a logical address of one or more personal address books (block 802). If there is only one PAB (block 804), the logical address of the PAB is stored in a memory (block 806). If there are multiple PABs (block 806), a user interface is provided to receive a search order for the PABs (block 808). The search order of the personal address books is stored (block 810).

Figure 9:
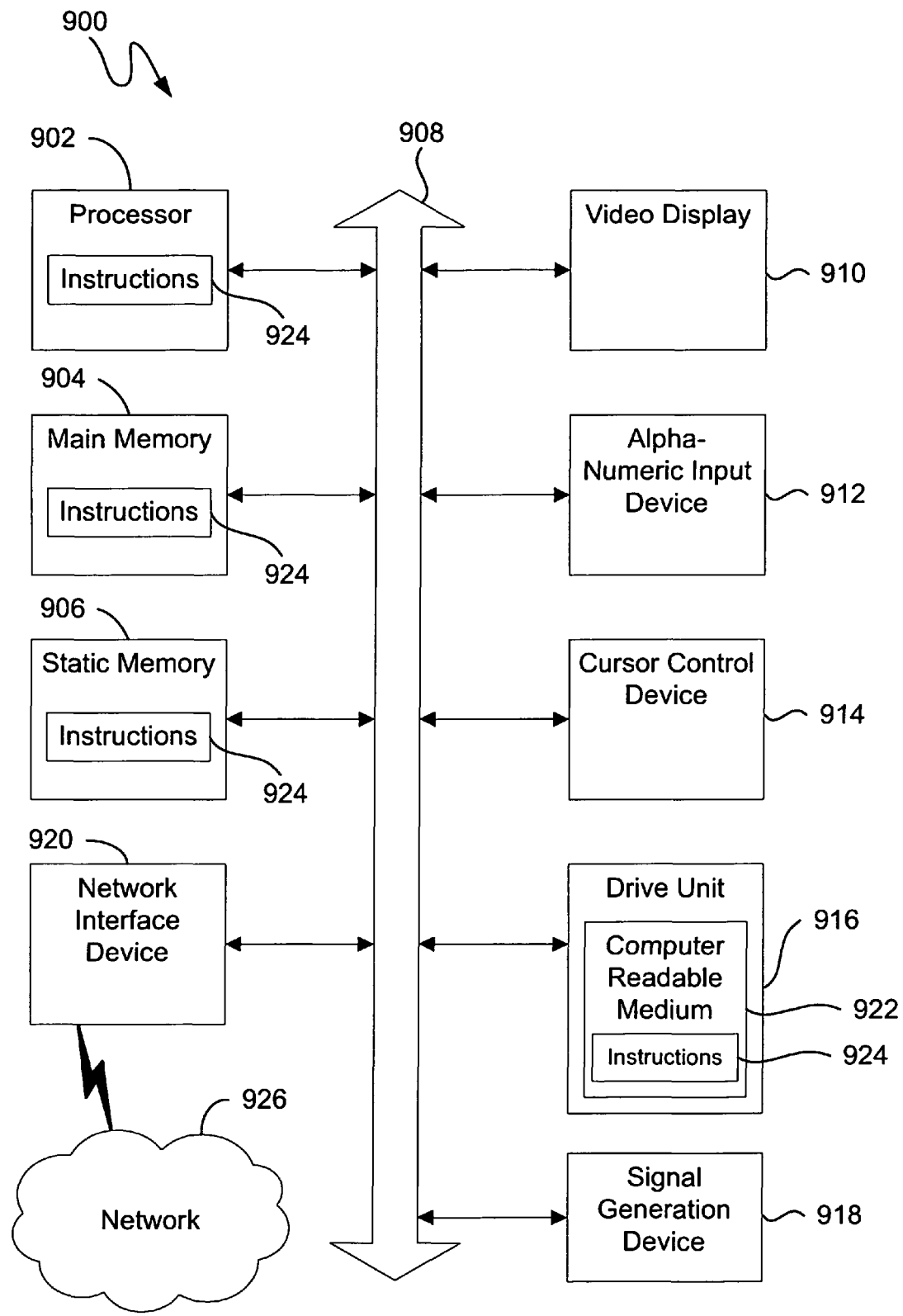
FIG. 9 is a block diagram that is representative of a general computer system on a personal address book may be stored and accessed.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, which can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving at a set-top box a call signal including a caller identifier from a network, the caller identifier including a calling number;
    searching a plurality of personal address books in a user-specified order until the calling number is found in a particular one of the plurality of personal address books;
    retrieving an alias associated with the calling number from the particular one of the plurality of personal address books; and
    transmitting a modified caller identifier including the calling number and the alias to a display device.

2. The method of claim 1, further comprising:
    receiving video data from a network when the call signal is received; and
    transmitting the video data and the modified caller identifier to the display device.

3. The method of claim 1, further comprising:
    storing calling numbers and associated alias information in a second personal address book; and
    synchronizing, during a period of call inactivity, the particular one of the plurality of personal address books to the second personal address book in a memory coupled to the set-top box.

4. The method of claim 1, further comprising generating a user interface to receive user inputs to configure caller identification display options of the set-top box.

5. The method of claim 1, further comprising generating a user interface to configure the set-top box to access the plurality of personal address books in a particular order.

6. A set-top box comprising:
    a memory to store one or more personal address books;
    a user interface to configure the logic to access the one or more personal address books in a user-specified order; and
    the logic coupled to a display device, to the memory, and to a public switched telephone network, the logic configured to:
        receive a call signal including a calling number from the public switched telephone network;
        search the one or more personal address books in the user-specified order for the calling number until the calling number is found in a particular personal address book;
        retrieve a display name from the particular personal address book corresponding to the calling number; and
        transmit the calling number and the display name to the display device.

7. The set-top box of claim 6, wherein the logic is adapted to receive video data from a network, the logic to transmit the video data to the display device.

8. The set-top box of claim 6, wherein the logic is adapted to synchronize the particular personal address book to a second personal address book.

9. The set-top box of claim 6, further comprising a network interface to couple the set-top box to a local area network, wherein the logic is adapted to send a missed call notification including the calling number and the display name to a user via the network interface.

10. The set-top box of claim 6, further comprising:
    a call log to store received call information;
    wherein the logic is adapted to generate a log entry in the call log, the log entry including the calling number and one of the display name and a billing name.

* * * * *